US005867538A

United States Patent [19]
Liu

[11] Patent Number: 5,867,538
[45] Date of Patent: Feb. 2, 1999

[54] COMPUTATIONAL SIMPLIFIED DETECTION OF DIGITALLY MODULATED RADIO SIGNALS PROVIDING A DETECTION OF PROBABILITY FOR EACH SYMBOL

[75] Inventor: Qingli Liu, Potomac, Md.

[73] Assignee: Hughes Electronics Corporation, El Segundo, Calif.

[21] Appl. No.: 515,175

[22] Filed: Aug. 15, 1995

[51] Int. Cl.[6] ...................................................... H03D 1/00
[52] U.S. Cl. ......................... 375/341; 371/43.7; 375/346
[58] Field of Search .................................. 375/261, 262, 375/264, 265, 266, 232, 233, 234, 286, 340, 341, 346, 348, 347, 316, 324, 325; 329/304; 364/724.19, 724.2; 371/43.1, 43.6, 43.7, 43.8

[56] References Cited

PUBLICATIONS

Erfanian, J.; "Reduced Complexity Symbol Detectors with Parallel Structures for ISI Channels"; *IEEE Transactions on Communications*, vol. 42, No. 2/3/4, Feb/Mar/Apr. 1994; pp. 1661–1671.

Hagenauer, J. et al.; "A Viterbe Algorithm with Soft–Decision Outputs and its Applications"; *German Aerospace Research Establishment (DLR) Institute for Communications Technology*, West Germany, IEEE, 1989, pp. 1680–1686.

Haykins, S.; "Adaptive Filter Theory", Chapter 1 Introduction, Prentice–Hall, 1986, pp. 4–7.

Koch, W. et al.; "Optimum and Sub–Optimum Detection of Coded Data Disturbed By time–Varying Intersymbol Interference", Germany, 1990 IEEE, pp. 1679–1684.

Proakis, J.; "Adaptive Equalization for TDMA Digital Mobile Radio", *IEEE Transactions on Vehicular Technology*, 40, No. 2, May 1991, pp. 333–341.

Proakis, J.; "Digital Communications", 2d. Edition, McGraw–Hill, Inc. 1989, pp. 602–605, 610–616, 624–627.

Robertson, P., et al.; "A Comparison of Optimal and Sub–Optimal MAP Decoding Algorithms Operating in the Log Domain"; *Institute for Communications Technology, German Aerospace Research Establishment (DLR), Germany; IEEE International Conference on Communications*, Seattle, Jun. 1995; pp. 1009–1013.

*Primary Examiner*—Chi H. Pham
*Assistant Examiner*—Bryan Webster
*Attorney, Agent, or Firm*—John T. Whelan; Michael W. Sales

[57] ABSTRACT

The invention provides simple and reliable detection of $\pi/4$ shifted DQPSK modulated digital signals in a single-subscriber-unit, a multiple-subscriber unit (MSU) or a base transceiver station (BTS) of a fixed-wireless system, and is also directly applicable to other digital cellular or personal communication systems which utilizes a binary or M-ary PAM, FSK or PSK digital modulation scheme with differential or coherent encoding and time- and/or frequency-multiplexing. It offers great simplicity while providing soft-decision information for the later stage decoding of information bits encoded with an error correcting code. For each received sample $z_{k+L}$ and its estimated one $\hat{z}_{k+L}$, a Euclidean distance function is calculated. This Euclidean distance $u(z_{k+L}|v_{k+L}, \ldots, v_k)$ is then added to the function derived from the previous iteration $g(v_{k+L-1}, \ldots, v_k)$, to yield a new Euclidean distance function $f(v_{k+L}, \ldots, v_k)$. Then a series of comparisons are carried out to find the minimum Euclidean distance with respect to each symbol within the channel memory span except $v_k$. These minimum Euclidean distances are then added up to yield M values. The symbol corresponding to the minimum distance is the detected symbol. The same M Euclidean distance values are also used for soft decision derivation for use with an error detecting code. A simple measure of the accuracy of each symbol is calculated from the two shortest Euclidean distances. In particular, by taking the ratio of the difference to the sum of those two distances, the overall implementation of the demodulator becomes especially computationally efficient.

17 Claims, 4 Drawing Sheets

COMPUTATIONAL SIMPLIFIED DETECTION OF DIGITALLY MODULATED RADIO SIGNALS PROVIDING A DETECTION OF PROBABILITY FOR EACH SYMBOL

TECHNICAL FIELD

The present invention relates generally to the reception of digitally modulated radio signals and more particularly to a detection method and apparatus based on the principle of maximum a posteriori probability ("MAP").

BACKGROUND ART

Digitally modulated radio signals may experience degraded signal quality as a result of multipath fading over a terrestrial terrain, co-channel interference, and/or receiver noise corruption. Known probabilistic methods for the detection of such degraded signals include a maximum likelihood sequence estimation ("MLSE") based on the Viterbi algorithm to estimate a sequence of symbols, and use of an a posteriori probability ("MAP") algorithm to estimate an individual symbol.

MLSE is particularly suited for a sequence in which each symbol is contaminated by adjacent symbols in a time-dispersive transmission medium (intersymbol interference or "ISI"). Although the conventional MLSE algorithm provides an optimal estimate of a sequence of symbols, it does not readily provide the detection probability for each individual symbol which is desirable for the later decoding of the user information bits, assuming that a convolutional error correction code was used to generate the original information bits. Although various enhanced MLSE schemes have been proposed for deriving soft decision information in MLSE detection, such enhanced MLSE schemes are very computationally intensive or are otherwise impractical for many applications.

The conventional MAP algorithm does provide detection probability for each individual symbol, and is suited for any kind of received signal, whether or not ISI is present and whether or not the original signal was encoded with an error correction code. However, for a received signal corrupted by thermal noise at the receiver front-end (this noise is normally modeled as additive white Gaussian noise and has an exponential probability density function), estimation of each symbol typically requires a summation of multiple exponential terms, which results in a large dynamic range and is difficult to implement efficiently. In particular, when estimating a symbol from received sample(s) containing additive white Gaussian noise, the classic MAP algorithm calculates conditional probabilities in the form of exponential functions of the Euclidean distance between the received sample and its estimated one. This imposes a large dynamic range requirement for the detection apparatus and difficulties for efficiently implementing such an algorithm, especially if a fixed-point processor is used.

Approximations of the MAP algorithm are known in which processing is exclusively in the logarithmic domain, with the sum of two exponential functions being approximated by the function having the greater exponent. Although the required calculations are considerably simplified, such an approximation introduces an error which may be expressed as a function of the difference of two exponents and for which a suitable correction term may be stored in a pre-computed table.

A basic implementation of MAP symbol detection is shown in FIG. 1. It consists of a delay unit T, a symbol demodulator MAP, and a channel impulse response estimator IRE. Upon receiving a sample sequence $\{z_{k+L}\}$, the MAP demodulator estimates a symbol $\{v_k\}$ from the estimated channel impulse response and all possibly transmitted symbols on the basis of maximum a posteriori probability. The channel impulse response estimator estimates the channel status by referring the received samples to a known symbol pattern, called the training sequence (such a sequence is normally available as a synchronization sequence in a time-multiplexing transmission scheme), or a prior symbol decision output from the MAP demodulator. Since normally the channel changes with time (for example, the fading typically experienced on a mobile radio channel), an updating algorithm (for example, the least-mean-square (LMS) algorithm, or the more fast convergent recursive-least-square (RLS) algorithm) is used to update the channel impulse response coefficients produced by the original estimation process, with the demodulated symbol decisions being used in the updated channel impulse response estimation. In this case, the decision made at a particularly time instant will lag the received symbol by several symbol periods (due to delay spread and the estimation lag), and a delay unit is used here to correlate the received symbol with the appropriate channel impulse response coefficients.

In some applications, the radio channel changes very little in a time-multiplexed transmission burst. In this case, only the symbols in the training pattern will be used for channel estimation. The channel parameters remain constant in the rest of symbol detection process. In some other applications where multiple synchronizations are employed the channel impulse response can be estimated from all the synchronization patterns and then they are interpolated to obtain channel parameters for data demodulation.

The digitally modulated signal transmitted over a terrestrial radio channel normally suffers from propagation loss, multipath fading, co-channel interference, and noise corruption. For a frequency-selective fading channel, the individual symbols transmitted will be spread out into their respective neighboring intervals and hence cause intersymbol interference (ISI). A demodulator is required in the baseband to recover the transmitted symbol at the possibly lowest detection error probability. For the frequency-selective fading channel where nulls exist in the received signal spectrum, an equalizer is needed to suppress ISI. At the same time, the equalizer shall not enhance noise around the frequency nulls. One commonly known technique for the above purpose is based on MAP (maximum a posteriori probability) and uses a so-called MAP demodulator, which suppresses the impairments and demodulates the transmitted symbols.

For radio applications, normally an error-correction code such as a convolutional code will be used in the system to further protect the symbols against transmission errors. At the receiver end, a decoder which follows the MAP demodulator is required to decode the information bits. For the convolutional code, soft decision decoding is highly preferred to hard-decision decoding because of the performance difference. Hence, the MAP demodulator is required not only to properly demodulate the transmitted symbols, but also provide soft decision reliability data to the decoder.

A classic MAP demodulator is shown in FIG. 2. In this demodulator, a recursive estimation process is employed to estimate each transmitted symbol. Specifically, upon receiving a new sample $z_{k+L}$, sample estimator 10 generates estimated samples $\hat{z}_{k+L}$ from the channel impulse response $c(I)$ and the ideal symbols $v_{k+I}$, where $I=0, \ldots, L$ and $L$ represents the channel memory length. For a modulation scheme with a symbol alphabetic size of M, $M^{L+1}$ estimates are required. Then an $M^{L+1}$-tuple probability function $p(z_{k+L}|v_{k+L}, \ldots, v_k)$ is calculated in block 12. Those skilled in the art will recognize that this probability function is an exponential function of the negative of the Euclidean distance between the received sample and its estimated one, scaled by noise variance $\sigma^2$. Then this probability function is multiplied (multiplier 14) with the $M^L$-tuple function $g(v_{k+L-1}, \ldots, v_k)$ to yield a new function $f(v_{k+L}, \ldots, v_k)$. The function $g(v_{k+L-1}, \ldots, v_k)$ is calculated (block 16) by summing $f(v_{k+L-1}, \ldots, v_{k-1})$ over $v_{k-1}$, the function obtained from the previous iteration. Since the detection process is a recursive one, the calculated $f(v_{k+L}, \ldots, v_k)$ is delayed by one unit in delay 18 and stored for the next iteration.

Sequential additions are then performed over $f(v_{k+L}, \ldots, v_k)$ by adders 20 with respect to all possible symbols $v_{k+L}, \ldots, v_{k+1}$, except $v_k$. The resultant sums yield M probabilities, with each corresponding to one possible symbol. Then a selection is carried out (block 22) to find the maximum probability and the corresponding symbol, which becomes the detected symbol.

The calculated M probability values are also used in block 24 to derive soft decisions for the later stage of decoding. Normally, a bit likelihood ratio can be directly derived from these probability values. In the case of M-ary differential phase modulation, either the related symbol probability is used as the probability of each bit, or a mapping is carried out to calculate the likelihood ratio of each bit from all related symbol probabilities.

DISCLOSURE OF INVENTION

The present invention greatly simplifies the computational complexity of the conventional MAP algorithm without necessarily compromising the optimality of MAP detection for radio signals in many practical applications (for example, commercial cellular and portable or fixed wireless communications) in which a relatively high signal-to-noise ($eg \geq 15$ dB) or signal-to-interference ratio ($eg \geq 17$ dB) has to be maintained, thereby making it particularly attractive for applications using a variety of binary or M-ary pulse-amplitude-modulation (PAM), frequency-shifted-keying (FSK) and phase-shifted-keying (PSK) differential or coherent modulation schemes in which reception quality may be somewhat impaired by multipath fading, co-channel interference and receiver noise.

The advantages of the invention lies in its great simplicity while maintaining the advantages of MAP detection for most practical applications and providing soft-decision information for the later stage decoding of information bits encoded with an error correcting code.

For each received sample $z_{k+L}$ and its estimated one $\hat{z}_{k+L}$, a Euclidean distance function is calculated, instead of the actual probability. This Euclidean distance $u(z_{k+L}|v_{k+L}, \ldots, v_k)$ is then added to the function derived from the previous iteration $g(v_{k+L-1}, \ldots, v_k)$, to yield a new Euclidean distance function $f(v_{k+L}, \ldots, v_k)$. Then a series of comparisons are carried out to find the minimum Euclidean distance with respect to each symbol within the channel memory span except $v_k$. These minimum Euclidean distances are then added up to yield M values. The symbol corresponding to the minimum one is found to be the detected symbol.

The same M Euclidean distance values are also used for soft decision derivation. Theoretically, one could employ the same technique as in the conventional MAP demodulator to derive soft decision data for a particular bit, that is, calculating bit likelihood ratio by taking exponential function over the negative of each calculated Euclidean distance. The latter exponential function approximates the actual symbol probability calculated in the conventional MAP demodulator. Hence, the soft decision data thus derived represents the reliability of each detected symbol. For this scheme, M exponential functions are required, which are significantly less than those required in a conventional MAP demodulator.

However, in a particularly simple embodiment, rather than calculating a detection probability for each symbol by taking the exponential function over the negative of each calculated Euclidean distance, a simpler measure of the accuracy of each symbol is used which is calculated from the two shortest Euclidean distances. In particular, by taking the ratio of the difference to the sum of those two distances, the overall implementation of the MAP demodulator becomes especially computationally efficient.

PREFERRED MODE FOR PRACTICING THE INVENTION

Figure 1:
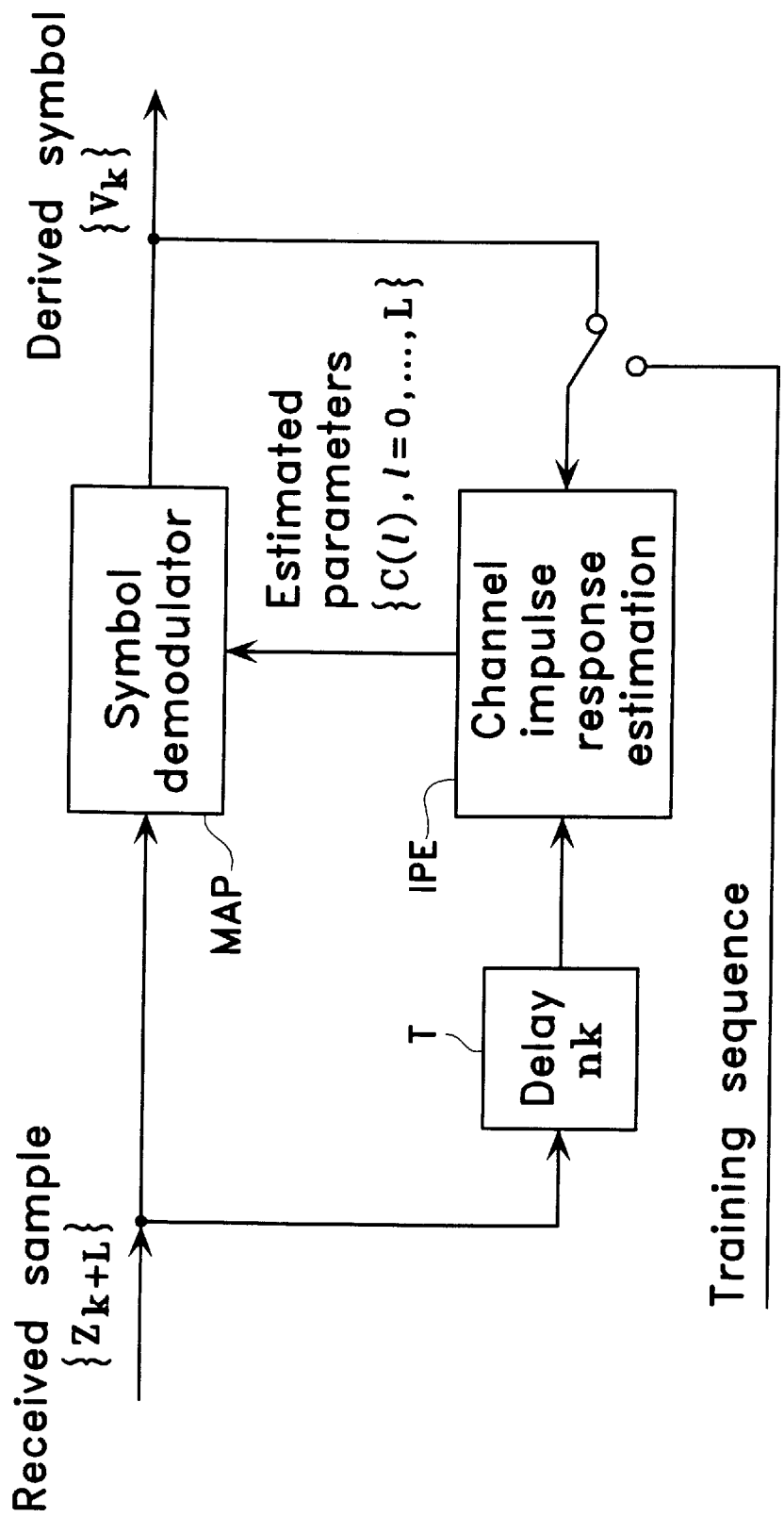
FIG. 1 is a block diagram showing a basic implementation of conventional MAP symbol detection.
Figure 2:
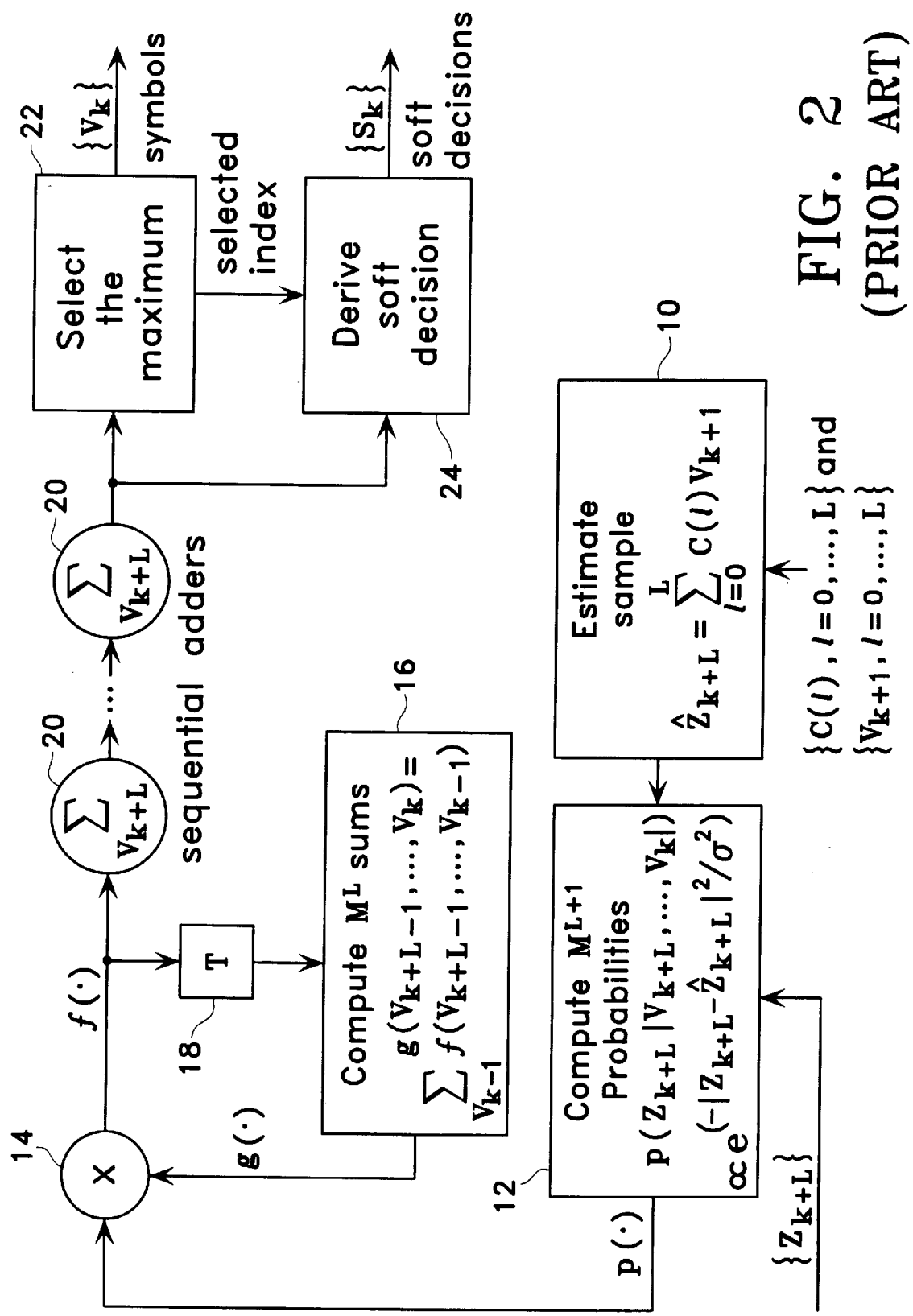
FIG. 2 is a schematic diagram of a classic MAP demodulator utilizing a recursive estimation process.

As noted above, the conventional MAP demodulator of FIG. 2 suffers from computational complexity. Specifically, for estimating a symbol, one needs to calculate $M^{L+1}$ exponential probability values and a series of summations in addition to other related operations. The cost for implementing these exponential functions is high either on a general-purpose digital signal processor or via application-specific IC's. This comes about because the exponential functions require tedious iterations or complicated circuitry in order to be accurately calculated. Further, a large dynamic range is also required.

In cellular radio or other wireless communications, normally certain carrier to noise or carrier to noise plus interference ratio should be maintained for the system to properly operate. In this case, some symbol probabilities in the MAP demodulator will become insignificant relative to the more probable symbols. Hence, some modifications can be done to the conventional MAP demodulator to make it computationally efficient.

Figure 3:
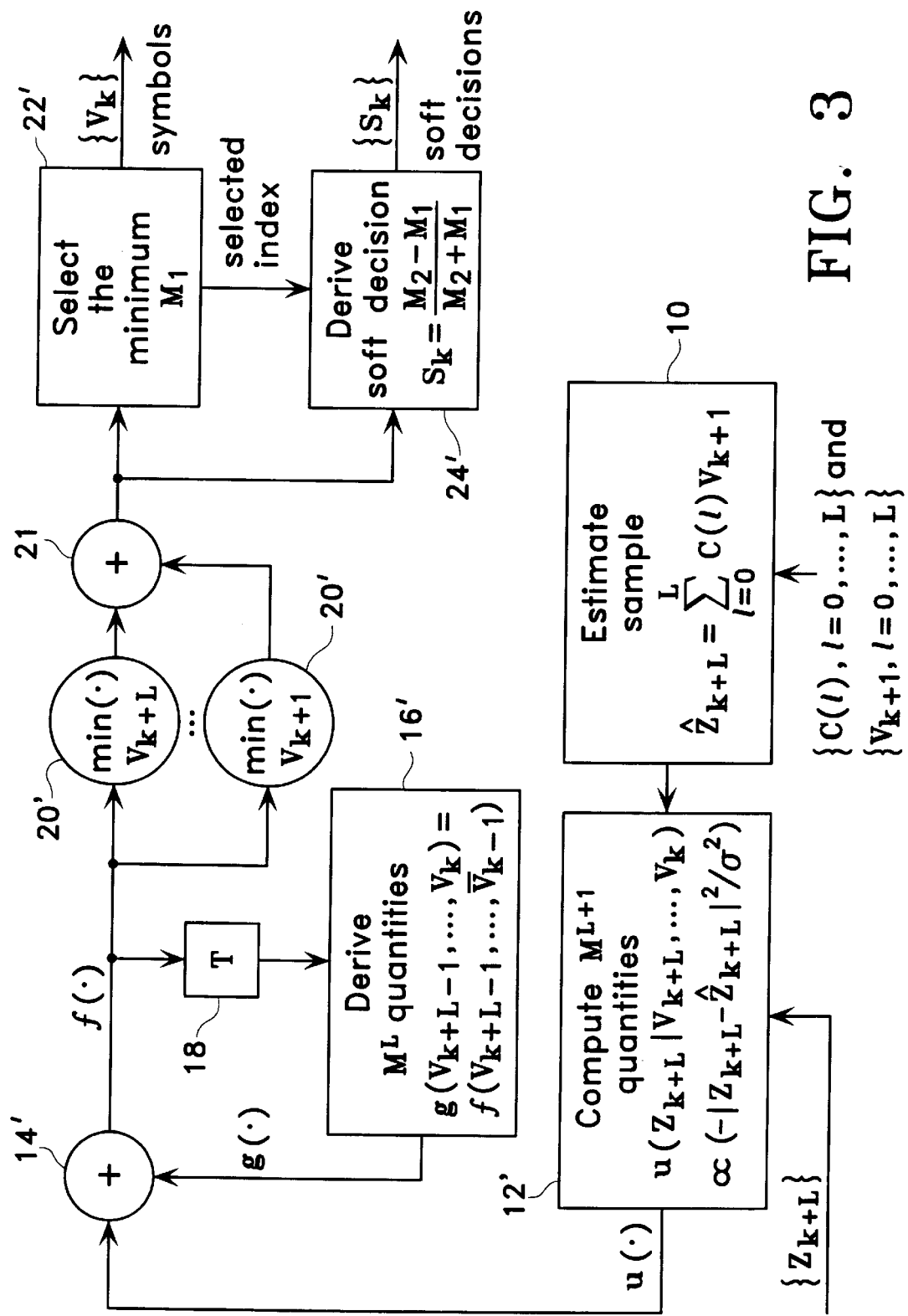
FIG. 3 shows a preferred embodiment of a simplified MAP demodulator in accordance with the present invention.

A preferred embodiment of a simplified MAP demodulator is shown in FIG. 3. In this demodulator, major portions of the original MAP demodulator have been modified, as indicated by the prime symbol. Firstly, for each received sample and its estimated one, a Euclidean distance is calculated (block 12'), instead of the actual probability. This Euclidean distance $u(z_{k+L}|v_{k+L}, \ldots, v_k)$ is then added (adder 14') to $g(v_{k+L}, \ldots, v_k)$, the function derived from the previous iteration, to yield a new Euclidean distance function $f(v_{k+L}, \ldots, v_k)$. Then a series of comparisons are carried out (blocks 20') to find the minimum Euclidean distance with respect to each symbol within the channel memory span except $v_k$. These minimum Euclidean distances are then added up (second adder 21) for each of the M possible symbols to yield M values. The symbol $v_k$ corresponding to the smallest of the M values $M_1$ is the detected symbol.

Note that $g(v_{k+L-1}, \ldots, v_k)$ is derived from $f(v_{k+L-1}, \ldots, v_{k-1})$. Since $v_{k-1}$ has been decided in the previous iteration (denoted in FIG. 3 as $\bar{v}_{k-1}$), it is directly used in deriving $g(v_{k+L-1}, \ldots, v_k)$. No addition or selection is done over $f(v_{k+L-1}, \ldots, v_{k-1})$ with respect to $v_{k-1}$.

The same M Euclidean distance values are also used for soft decision derivation (block 22'). In the preferred embodiment illustrated in FIG. 3, the soft decision data is calculated (block 24') by taking the difference $M_2-M_1$ of the second best minimum Euclidean distance $M_2$ and the minimum one $M_1$, which is then divided by the sum of the two $M_2+M_1$ to form a ratio $(M_2-M_1)/(M_2+M_1)$. It will be recognized that if the two most likely symbols each produce an expected sample which is the same distance from the received sample, then at best there is only a 50% probability that the chosen symbol is correct and the reliability of the decision is relatively low. Conversely, if the second most likely symbol produces an expected sample that is much more distant from the received sample compared to the expected sample from the most likely symbol, the probability that the received symbol corresponds to the chosen symbol is much higher and the reliability of the decision is relatively high. Similarly, if both samples produce estimates that are relatively far from the received sample, then the reliability will be less than if the estimates are relatively close to the received sample.

A soft decision calculation scheme based on the $(M_2-M_1)/(M_2+M_1)$ ratio is especially attractive for demodulating a differentially modulated signal. This is because in this case, the derived reliability information for each symbol is directly used as the reliability information for the bit related to the symbol. This is done with little performance degradation to the later stage of soft decision decoding. However, by so doing, the complicated mapping from symbol probabilities to bit probabilities is avoided.

Preferably, the ratio $(M_2-M_1)/(M_2+M_1)$ is multiplied by a scaling factor corresponding to the average received signal energy. It has been verified that by including such a scaling factor the performance is further improved. A normalization process may also be carried out for all the soft decision data from a single TDMA burst, in which the absolute values of the soft decisions in a burst are averaged and the average value is used to scale each individual soft decision, thereby avoiding performance loss caused by either overflow or underflow in the fixed-point arithmetic representation of soft decisions.

In any event, all exponential functions may be eliminated both from the selection of the symbol having the greatest probability of being the correct symbol and from the computation of the soft decision data reflecting the probability that the correct symbol was selected at a particular position.

From various computer simulation results, it has been verified that the above-described preferred embodiment exhibits comparable performance to that of a conventional MAP demodulator, and in the worst case, is inferior to the conventional MAP demodulator by only 0.3 dB. However, it outperforms MLSE with a suitable soft decision derivation scheme by a factor of 0.5~1.0 dB. These simulated results assume a digitally modulated radio signal occupying a 30 kHz bandwidth and modulated by a $\pi/4$-shifted DQPSK modulation scheme, with the radio signal being transmitted over a multipath fading channel subjected to both flat fading and frequency-selective fading with a fading Doppler shift of up to 30 miles/hr, using a two-ray model with the two rays having equal average power but independent Rayleigh fading statistics and a delay spread of up to one symbol period (41.15 $\mu$s), and with a front-end selection being carried out between two antennas whereby, for each TDMA burst, the signal is received from one preferred antenna only.

Figure 4:
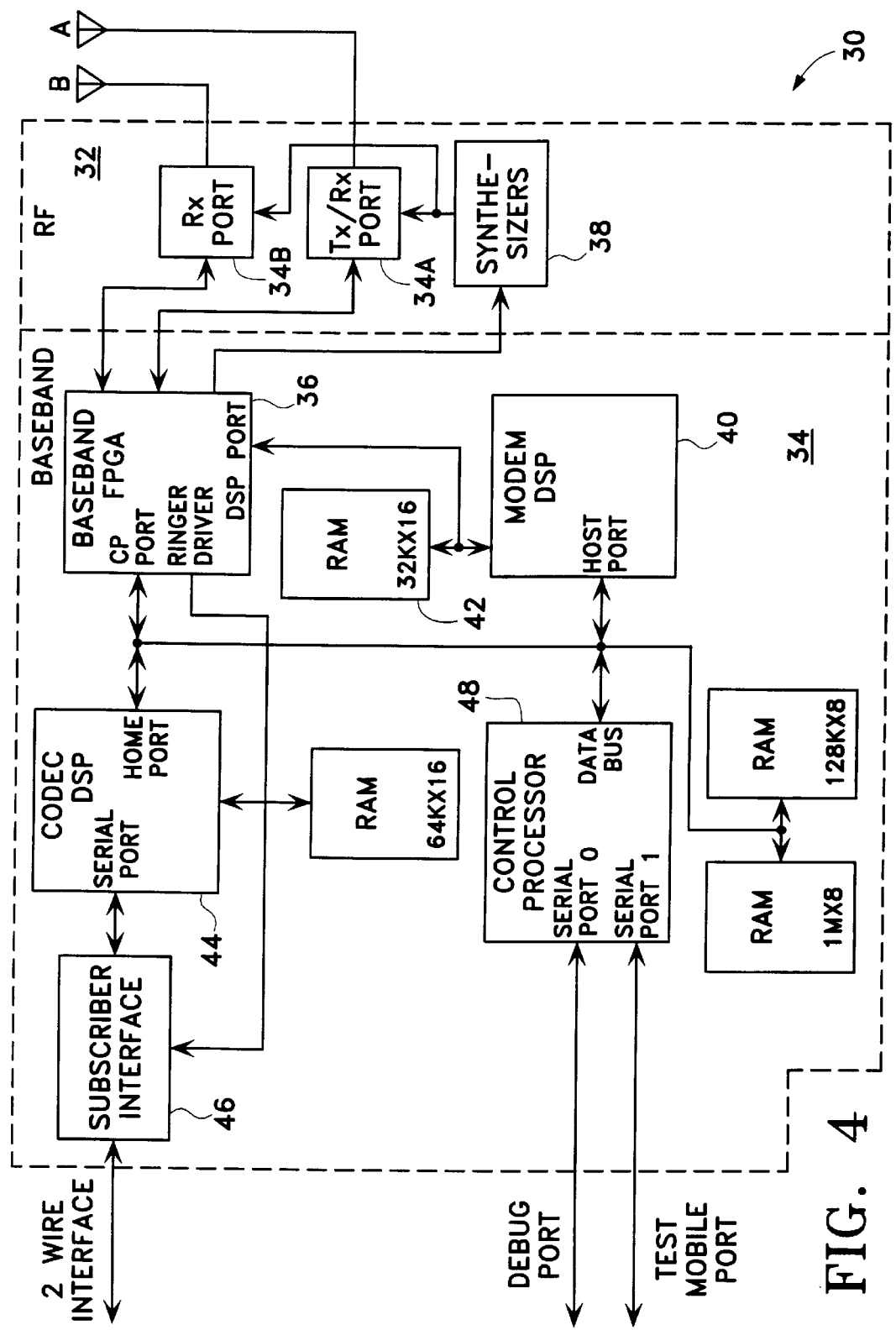
FIG. 4 shows a preferred implementation of a single-subscriber-unit of TDMA fixed-wireless system using $\pi/4$ shifted DQPSK modulation which incorporates the present invention.

FIG. 4 shows a preferred implementation of a single-subscriber-unit 30 of TDMA fixed-wireless system using $\pi/4$ shifted DQPSK modulation which incorporates the present invention, comprising an RF section 32 and a baseband section 34. The RF section 32 includes two antennas A,B, each associated with a respective port 34A, 34B which in receive mode generate a respective stream of digital samples to the Field Programmable Gate Array ("FPGA") 36, under the control of synthesizers 38 responsive to control outputs from FPGA 36.

The modem Digital Signal Processor ("DSP") 40 utilizes a commercially available AT&T 1611 chip and in accordance with a program incorporating the above described modified MAP algorithm and other conventional software stored in program memory 42 functions as a demodulator and also performs a number of other related receiving functions such as receiving the I/Q data samples from the FPGA at the rate of 48.6 kHz, performing the error correction decoding, calculating the bit error rate, selecting the preferred antenna, and controlling the various other initialization, testing, acquisition and synchronization functions typically found in digital receivers, as well as the RSSI measurements typically required for establishing a communication link to an available base station in a wireless communication system.

In receive mode, modem DSP 40 forwards the demodulated and decoded command and user data to the Codec DSP 44 (AT&T 1611, which provides a conventional serial output to subscriber interface 46) and/or to the Control Processor 48 (which is an 80188 EC responsible for overall control and timing and which also provides diagnostic outputs during testing and debugging). In transmit mode, the modem DSP 40 receives command and user data from the Codec DSP 44 as well as timing and command data from the Control Processor 48, encodes the data, assembles it into timeslots, and routes the data and associated control information through FPGA to transmit port 34A and synthesizer 38.

In summary, although the above-described modified MAP demodulator with its simplified soft decision output is as effective as a conventional MAP or MLSE demodulator, it exhibits much lower complexity than the conventional one, and the soft decision derivation is also considerably simplified. It provides simple and reliable detection of $\pi/4$ shifted DQPSK modulated digital signals in a single-subscriber-unit, a multiple-subscriber unit (MSU) or a base transceiver station (BTS) of a TDMA fixed-wireless system, and is also directly applicable to other digital cellular or personal communication systems which utilizes a binary or M-ary PAM, FSK or PSK digital modulation scheme with differential or coherent encoding and time- and/or frequency-multiplexing.

What is claimed is:

1. A method of detecting a received digital signal, comprising the steps:

for each received sample corresponding to a transmitted sequence of L symbols selected from an alphabet of M different symbols, calculating a Euclidean distance for each of M possible symbols to yield M Euclidean distance values, selecting a symbol corresponding to a smallest of the M Euclidean distance values as a detected symbol, calculating a difference between the smallest Euclidean distance value and a second smallest Euclidean distance value, and using said difference to calculate a soft decision output for the detected symbol.

2. The method of claim 1, further comprising the steps of calculating a sum by adding said smallest Euclidian distance value and said second smallest Euclidean distance value, and dividing said difference by said sum to thereby calculate a ratio representative of said soft decision output.

3. The method of claim 2, wherein the ratio is multiplied by a scaling factor corresponding to an average received signal energy.

4. The method of claim 1, wherein the calculation of the Euclidean distance is an iterative process.

5. The method of claim 1, wherein the calculation of the Euclidean distance is performed in the logarithmic domain of an exponential probability function.

6. A detector for detecting a received digital signal, comprising:

distance calculating means responsive for each received sample corresponding to a transmitted sequence of L symbols selected from an alphabet of M different symbols, for calculating a Euclidean distance for each of M possible symbols to yield M Euclidean distance values, selection means for selecting a symbol corresponding to a smallest of the M Euclidean distance values as a detected symbol, and soft decision means for calculating a difference between the smallest Euclidean distance value and a second smallest Euclidean distance value, and using said difference to calculate a soft decision output for the detected symbol.

7. The apparatus of claim 6, wherein said soft decision means calculates a sum by adding said smallest Euclidian distance value and said second smallest Euclidean distance value, and divides said difference by said sum.

8. The apparatus of claim 6, wherein said received digital signal is a π/4 shifted DQPSK (Differential Quadrature Phase Shift Keying) modulated digital signal occupying a 30 kHz bandwidth and said detector is incorporated in a receiver of a single-subscriber-unit, a multiple-subscriber unit (MSU) or a base transceiver station (BTS) of a fixed-wireless TDMA (Time Division Multiple Access) system, with the radio signal being transmitted over a multipath fading channel subjected to both flat fading and frequency-selective with a fading Doppler shift of up to 30 miles/hr and a delay spread of up to one symbol period (41.15 mg).

9. The apparatus of claim 8, wherein said unit further comprises two antennas and front-end selection means for selecting, for reception of said signal during each TDMA burst, a preferred one of said two antennas.

10. The method of claim 1, further comprising the step of selecting, for reception of said received digital signal, one of two separate signal reception antennas.

11. A method of detecting a received digital signal, comprising the steps:

for each received sample corresponding to a transmitted sequence of L symbols selected from an alphabet of M different symbols, calculating a Euclidean distance for each of M possible symbols to yield M Euclidean distance values, selecting a symbol corresponding to a smallest of the M Euclidean distance values as a detected symbol, calculating a difference between the smallest Euclidean distance value and a second smallest Euclidean distance value, using said difference to calculate a soft decision factor for the detected symbol, and multiplying the soft decision factor by a scaling factor corresponding to an average received signal energy to obtain a soft decision output for the detected symbol.

12. The method of claim 11, wherein said step of calculating a soft decision factor further comprises the steps of:

calculating a sum by adding said smallest Euclidian distance value and said second smallest Euclidean distance value, and dividing said difference by said sum.

13. The method of claim 11, wherein the calculation of the Euclidean distance is an iterative process.

14. The method of claim 11, wherein the calculation of the Euclidean distance is performed in the logarithmic domain of an exponential probability function.

15. The method of claim 11, further comprising the step of selecting, for reception of said received digital signal one of two separate signal reception antennas.

16. The method of claim 11, wherein said received digital signal is a π/4 shifted DQPSK (Differential Quadrature Phase Shift Keying) modulated digital signal for a wireless TDMA (Time Division Multiple Access) system, with the radio signal being transmitted over a fading channel.

17. The method of claim 11, wherein said detector is incorporated in a receiver of a subscriber unit or a base transceiver station of a wireless radio communications system, with the radio signal being transmitted over a fading channel subject to fading, Doppler shift and a delay spread.

* * * * *